United States Patent
Reuschel et al.

(10) Patent No.: US 6,464,603 B1
(45) Date of Patent: Oct. 15, 2002

(54) METHOD AND APPARATUS FOR CONTROLLING A TRANSMISSION

(75) Inventors: Michael Reuschel, Bühl; Ludger Holtmann, Karlsruhe, both of (DE)

(73) Assignee: LuK Lamellen und Kupplungsbau Beteiligungs KG, Buhl/Baden (DE)

( * ) Notice: Subject to any disclaimer, the term of this patent is extended or adjusted under 35 U.S.C. 154(b) by 0 days.

(21) Appl. No.: 09/684,722

(22) Filed: Oct. 6, 2000

(30) Foreign Application Priority Data

Oct. 6, 1999 (DE) ......................................... 199 48 303
Oct. 6, 1999 (DE) ......................................... 199 48 304

(51) Int. Cl.⁷ ............................................. F16H 61/00
(52) U.S. Cl. ..................................................... 474/28
(58) Field of Search ..................... 474/18, 28; 477/44, 477/45, 46, 48; 701/58, 60

(56) References Cited

U.S. PATENT DOCUMENTS 5,062,050 A * 10/1991 Petzold et al. ........... 364/424.1
5,298,000 A * 3/1994 Rattunde et al. .............. 474/24
5,725,447 A * 3/1998 Friedmann et al. ........... 474/18
5,885,186 A * 3/1999 Van Wijk et al. .............. 474/43
5,947,862 A 9/1999 Knapp et al.
5,961,408 A 10/1999 König et al.
6,050,917 A 4/2000 Gierling et al.
6,085,136 A * 7/2000 Katakura et al. ............. 701/51

* cited by examiner

*Primary Examiner*—Thomas R. Hannon
*Assistant Examiner*—Timothy McAnulty
(74) *Attorney, Agent, or Firm*—Darby & Darby

(57) ABSTRACT

The ratio-controlling hydraulic pressure in a continuously variable cone-pulley transmission is regulated by means of a regulating device in such a way that the control parameters of the regulating device are adjusted depending on the amounts of ratio-controlling pressure to be applied and that the regulation is performed by using the adjusted control parameters. The method includes measures for maintaining a set transmission ratio at a continuing constant level.

12 Claims, 5 Drawing Sheets

METHOD AND APPARATUS FOR CONTROLLING A TRANSMISSION

BACKGROUND OF THE INVENTION

The present invention relates to a method and apparatus that are used to regulate by way of a regulating device the hydraulic fluid pressure that is applied through a control valve to one or more piston/cylinder units of a continuously variable cone-pulley transmission in order to set or change the transmission ratio.

A continuously variable cone-pulley transmission of the kind that the invention relates to has two adjustable pulleys, i.e., a first pulley mounted on a first shaft (input shaft) and a second pulley mounted on a second shaft (output shaft), and an endless flexible element such as a chain or belt (subsequently referred to as a chain-belt) to transmit torque between the pulleys. Each pulley is essentially a pair of conically tapered discs. In each pulley, one disc is rigidly connected to the respective shaft, while the other disc is constrained to the shaft only in the rotational sense but movable in the axial sense of the shaft.

The gripping pressure to hold the chain-belt between the discs is applied through actuating members that are arranged at the movable discs. The actuating members are pressurized by a torque sensor that is responsive to the magnitude of the torque to be transmitted. At least one of the disc pairs has a second actuating member configured as a ratio-controlling piston/cylinder unit that can be hydraulically pressurized to a pressure level (subsequently called the ratio-controlling pressure) that varies depending on the rpm-ratio (subsequently called the transmission ratio) that is to be set between the input shaft and the output shaft of the continuously variable transmission. The pressurized working fluid is delivered to the ratio-controlling piston/cylinder unit by way of a transmission-ratio valve.

The ratio-controlling pressure can be influenced by a pressure valve that supplies the transmission-ratio valve with an adequate amount of pressure for a rapid shifting of the axial positions of the movable discs and thus a rapid change of the D transmission ratio. For example, if the driver of a vehicle equipped with this type of transmission depresses the gas pedal to increase the speed of the vehicle, the immediate consequence is an increase in the amount of power that the engine delivers to the cone-pulley transmission. To translate the power increase into an acceleration of the vehicle requires an appropriate change of the transmission ratio, which requires a change in the ratio-controlling pressure that is delivered to the ratio-controlling piston/cylinder unit.

The transmission-ratio valve can be a pilot-controlled pressure-reducing valve whose pilot pressure is variable under the control of a proportional valve. The proportional valve, by generating appropriate changes of the pilot pressure, causes the transmission-ratio valve to open or to further increase the opening of a hydraulic passage to the piston/cylinder unit. The change of the pilot pressure delivered to the transmission-ratio valve occurs as a result of a change in the controlling electric current of the proportional valve. The controlling current of the proportional valve therefore has to be tied into a servo loop in which the actual current value is compared to a given target value, so that a deviation of the actual value from the target value can be corrected by the regulating servo. The same applies also in case where the transmission-ratio valve is controlled directly by an electric current to effect variations in the ratio-controlling pressure delivered to the piston/cylinder unit.

The vehicle power plant consisting of the continuously variable transmission and the combustion engine is exposed to significant variations of its operating conditions. For example, there may be large variations in the fluid temperature of the hydraulic circuit. As another example, a change of the transmission ratio will also cause changes in the behavior of the piston/cylinder unit and in the regulating behavior of the transmission-ratio valve. These are only two examples of factors that have an influence on the behavior of the hydraulic control of the transmission ratio.

OBJECT OF THE INVENTION

It is therefore the object of the present invention to provide a method and apparatus for controlling the ratio-controlling pressure of a working fluid by means of a regulating device, wherein variations in the regulating behavior of the transmission-ratio valve under different operating conditions are taken into account.

SUMMARY OF THE INVENTION

The invention meets the foregoing objective by introducing a method of regulating by way of a regulating device the ratio-controlling pressure that is applied through a transmission-ratio valve to one or more piston/cylinder units of a continuously variable cone-pulley transmission in order to set or change the transmission ratio. According to the invention, the ratio-controlling pressure is regulated in such a way that certain operating parameters of the regulating device (that will be referred to as control parameters) are adjusted depending on the amounts of ratio-controlling pressure to be applied and that the regulation is performed by using the adjusted control parameters.

Thus, the inventive method takes into account that with changing operating conditions, the transmission-ratio valve can in some cases have significantly different response times when there is a change in a control variable or an abrupt change in an extraneous interference quantity. In other words, the transfer function of the transmission-ratio valve is subject to change under different operating conditions. When the amount of current is changed in the proportional valve that generates the pilot pressure for the transmission-ratio valve, or also when the amount of current is changed in a current-controlled transmission-ratio valve in order to change the position of the valve piston in the piston bore, the reaction times for moving the piston to a different position will vary, i.e., the settling times for transient oscillations will be of different length. If the regulation is performed, e.g., by means of a regulating device configured as a P/I servo with proportional and integrating components and constant control parameters, it is possible that certain deviations or excursions of a quantity to be regulated can no longer be brought under control because the stability limit of the servo circuit has been reached and the aforementioned oscillations would no longer settle down.

In a continuously variable cone-pulley transmission of a kind where both of the disc pairs on the input shaft and the output shaft, respectively, are equipped with a piston/cylinder unit for setting or changing the transmission ratio, there is a change-over in the pressure between the piston/cylinder units and in the transmission-ratio valve, so that the characteristic curve of the transmission-ratio valve (pressure vs. current) has an inversion point or area (zero-pressure range) where the transmission-ratio valve is pressure-free. Therefore, if the regulation were performed with constant control parameters throughout the entire range of the characteristic curve of the transmission-ratio valve, the regulating device would reach its stability limit when operating in the zero-pressure range, and the response would no longer be a transient oscillation settling in at the new target pressure. If the control parameters were adapted only according to a limited range in the vicinity of the inversion point, then the regulating device would have a markedly sluggish reaction when operating outside of the zero-pressure range. On the other hand, if the control parameters were dimensioned to work for a regulation outside of the zero-pressure range, the regulation would be unstable when operating inside the zero-pressure range, i.e., the regulating servo circuit would suffer from instabilities.

The invention solves the foregoing problem by introducing the concept of adapting the control parameters in the regulating device to the targeted ratio-controlling pressure and performing the regulation process by using the adapted control parameter values. Values for the control parameters are therefore determined for different operating points within the range of operating conditions of the transmission-ratio valve, to allow the regulating device to work optimally within its entire operating range by adapting the control parameters to the different operating points.

According to the invention, the control parameters are kept in the form of characteristic curves or as a field of characteristic curves, or also as equations to compute the control parameter values based on different input parameters that are relevant for the ratio-controlling pressure, such as the engine-rpm rate, transmission ratio, engine torque, and output torque of the continuously variable cone-pulley transmission. Now, when the transmission is in operation and as the regulating device enters one of the regulating ranges at the different operating points, the regulating device will regulate the ratio-controlling pressure by using the control parameter values that are applicable to that range based on the characteristic curves or the characteristic curve field or the aforementioned equations, which provide the control parameter values on the basis of measured or calculated values of relevant input parameters. It is also possible to use standard parameter values and adjust them by a certain correction factor depending on which part of the range of the transmission-ratio valve is being used, and to perform the regulation based on the corrected control parameter values.

In a further developed version of the inventive method, the control parameters are determined depending on the amplification or gain factor of the transmission-ratio valve and the regulation is performed with parameter values that are corrected in the inverse sense of the gain of the transmission-ratio valve. This is advantageous in a case where a change in the transfer function of the regulating valve can be described in terms of a change in the amplification of the valve, e.g., if the valve has a markedly lower amplification in the zero-pressure range than in the two ranges adjoining the zero-pressure range. Advantageously, the amplification is expressed in the form of an amplification curve and the correction that is applied to the control parameters is a multiplication by the inverse value of the amplification, so that the non-linear behavior of the ratio-controlling member can thereby be linearized.

The working fluid in the hydraulic circuit of the cone-pulley transmission can be an hydraulic oil of a temperature-dependent viscosity. The invention therefore includes the feature of determining the control parameters depending on the temperature of the working fluid.

The latter concept is advantageous in a case where the transfer function of the transmission-ratio valve changes as a function of temperature. For example, if the dynamic behavior becomes weaker with increasing temperature, it is advantageous to determine the control parameters dependent on the temperature or to apply a temperature-dependent correction to the control parameters, so that the control parameter values are lowered when there is a weakening of the dynamic response, whereby the regulating servo circuit can be prevented from becoming unstable as would be the case with control parameters of a fixed, constant value. Further under this concept, it is of advantage if the control parameters are expressed as a temperature-dependent curve. The parameter values used for the regulation could be standard values that are corrected by a certain percentage in accordance with the temperature-dependent curve so as to avoid the unfavorable regulating conditions that occur with fixed control parameters. The piston/cylinder unit at one disc set or the units at both disc sets are supplied by way of the transmission-ratio valve with a ratio-controlling pressure to set or change the transmission ratio. The transmission-ratio valve is part of a hydraulic circuit that is pressurized by a pump pressure or system pressure. The transmission-ratio valve receives this system pressure as input pressure and delivers a ratio-controlling pressure to the piston/cylinder unit. A further developed embodiment of the invention provides therefore that the control parameters be determined as a function of the ratio between the input pressure and the ratio-controlling pressure. If the regulating behavior of the transmission-ratio valve is changing as a result of a pressure differential between the system pressure and the ratio-controlling pressure, it is advantageous if this is taken into account in the regulation process and the control parameters used for the regulation are adjusted accordingly. The dynamic behavior of the transmission-ratio valve can become stronger with an increase in the pressure differential, and thus it will be advantageous to apply a corresponding upward correction to the control parameter values in order to shorten the settling time at the new target pressure.

As has been mentioned above, it is advantageous if the control parameters are expressed in the form of characteristic curves and/or characteristic curve fields and/or equations for the control parameters. According to an embodiment of the invention, a finite number of control parameter values are stored as table values which are used to interpolate intermediate values. This has the advantage that changes of the control parameters occur as continuous variations rather than in steps, so that there are no discontinuous changes that could adversely affect the comfort level of a vehicle equipped with a cone-pulley transmission that operates according to the present invention.

According to a further developed version of the inventive method, the changes applied to the control parameters between two regulating cycles, i.e., the change that the regulating device calculates in an individual step for the regulating process, is limited to a preset amount. This limits the rate of change between two regulation cycles, so that no abrupt changes will adversely affect the comfort of the occupants of the vehicle.

In accordance with the invention, the regulating device is a P/I servo (i.e., a feedback controller with a proportional and an integrating component) whose control parameters can be adjusted individually or together. If the transmission-ratio valve shows a delayed response in a regulation cycle because the valve piston has to overcome a static friction force in the bore hole, or if the valve has a markedly weaker response at the transition from static friction to sliding friction, the situation can be corrected according to the invention by adjusting only one of the control parameters, e.g., the I-component while leaving the P-component unchanged or, alternatively, by changing the P-component and leaving the I-component unchanged.

The invention further includes a method of regulating the transmission ratio of a cone-pulley transmission so that the transmission-ratio stays essentially constant.

For example, if a vehicle with a cone-pulley transmission is to maintain its speed at a level that can be given, e.g., by the driver, the transmission ratio will have to be kept at a constant level, if the rpm-rate of the engine is to stay unchanged. This is particularly important in the slow range or underdrive range of the transmission, because a change in the transmission ratio would lead to a higher vehicle speed. It is of special importance when a vehicle with a cone-pulley transmission moves backwards, that the transmission ratio stays unchanged when starting up and when traveling in reverse gear.

The transmission referred to in the preceding paragraph is again a continuously variable cone-pulley transmission of the kind that has two pairs of conical discs, i.e., a first pair mounted on a first shaft (input shaft) and a second pair mounted on a second shaft (output shaft), and an endless flexible element such as a chain or belt to transmit torque between the pulleys. The compressive gripping force of the conical discs against the chain-belt is applied through actuating members that are arranged at the disc pairs and apply a force that depends on the amount of torque to be transmitted. At least one of the disc pairs is equipped with a second actuating member, likewise a piston/cylinder unit, which is pressurized with a working fluid to a pressure level that depends on the transmission ratio that is to be set. The pressurized working fluid is directed to the ratio-controlling piston/cylinder unit by way of a transmission-ratio valve.

The transmission-ratio valve can be a pilot-controlled pressure-reducing valve whose pilot pressure is controlled by means of a proportional valve. To open up or to change the opening cross-section of a passage for a fluid stream from the transmission-ratio valve to the piston/cylinder unit, the transmission-ratio valve is controlled by the level of the pilot pressure generated by the proportional valve, so that a change in the electric current through the proportional valve leads to a change in the pilot pressure that controls the transmission-ratio valve.

Until now, the procedure for holding the transmission ratio constant in the reverse travel mode has been to use a high level of current to generate a high level of pilot pressure. This leads to a high ratio-controlling pressure in the piston/cylinder unit that controls the transmission ratio, so that the transmission is held in the slow range or underdrive with a strong actuator force. As there are unavoidable random variations in the serial production from one transmission unit to the next in regard to the amount of force that each transmission requires for being held safely in the underdrive mode, the use of a high level of current assures that any one of the different transmissions of a series can be held safely in underdrive when driving backwards.

It should be obvious that the high current level is disadvantageous to the overall fuel consumption of the vehicle and that the high level of ratio-controlling pressure or ratio-controlling force causes a high level of contact force between the conical discs and the chain-belt, which can cause increased wear on the chain-belt.

The method according to the invention therefore includes measures whereby the transmission-ratio of a cone-pulley transmission is set in such a manner that the aforementioned disadvantages are avoided.

To meet this objective, the invention provides a way of setting the transmission ratio of a continuously variable cone-pulley transmission at an essentially constant level. Under the inventive method, the transmission is first set to the targeted ratio by pressurizing at least one piston/cylinder unit, whereupon the same or another piston/cylinder unit is pressurized with a holding pressure for the purpose of maintaining the set transmission ratio. According to the inventive method, the amount of holding pressure is specific to a given transmission, i.e., the holding pressure or holding force, or a current level by which the holding pressure is generated, can be different from one unit to the next, but the amount of holding pressure is selected to be only as large as required in a given individual transmission for maintaining the set transmission ratio. The use of an unnecessarily high ratio-controlling pressure is thereby avoided.

The first step, i.e., pressurizing a piston/cylinder unit to set the transmission to the targeted ratio, can be performed with a pressure that corresponds to the holding pressure, if the holding pressure can already be used to set the transmission to the desired ratio. If a continuously variable cone-pulley transmission has more than one piston/cylinder unit for setting the transmission ratio, the ratio-setting or changing pressure can be applied to one or also to more than one of the piston/cylinder units, and the holding pressure can then be applied to another of the piston/cylinder units.

In particular, the inventive method is provided for the purpose of setting and holding the slow-speed ratio, i.e., the underdrive mode of the continuously variable cone-pulley transmission.

According to the invention, the pressure is introduced into the piston/cylinder unit by way of a transmission-ratio valve to which a controlling quantity is applied. The amount of the controlling quantity is determined such that the holding pressure is the minimum holding pressure required in a specific given transmission. The controlling quantity can be a pressure or also a current. The controlling quantity can be applied directly or indirectly to the transmission-ratio valve. With direct application, the controlling quantity is applied directly to the transmission-ratio valve. In the case of indirect application, e.g., if the transmission-ratio valve is controlled by a pilot pressure, the controlling quantity acts on the proportional valve which, in turn, generates a pilot pressure to control the transmission-ratio valve.

In an advantageous embodiment of the invention where the controlling quantity is a current, a value of the controlling current that corresponds to the minimum holding pressure is based on the difference between a controlling current that corresponds to the maximum amount of pressure and a controlling current that corresponds essentially to the zero level of the ratio-controlling pressure.

Following is a possible procedure for determining the minimum holding pressure or the corresponding amount of controlling current, which is specific to a given transmission: A test unit of the given transmission model is first set to underdrive, whereupon the engine that is coupled to the transmission is run through a sweeping variation of its rpm rate over the entire engine-rpm range while the transmission is held in a regulated underdrive condition. During the rpm sweep from idling speed to the maximum rpm rate, the controlling current will at some point reach a maximum. The maximum value of the current, as a rule, is greater than a zero-pressure value of the current. The zero-pressure value is the current value where the ratio-controlling pressure of the piston/cylinder unit is essentially zero and where the characteristic curve of the transmission-ratio valve has an inversion point. The controlling current required to hold a transmission in underdrive can be based on the difference between the maximum value and the inversion-point value of the current. To allow for the specific behavior of an individual transmission in holding the underdrive mode, the amount of controlling current required for a secure holding pressure can be determined by adding the aforementioned current difference to the inversion-point current of the given individual transmission. The controlling current determined in this manner can be significantly lower than a uniform value of the controlling current that would be large enough to cover in every case the range of random variation between all transmissions produced in a serial manufacturing process.

Among other factors, the ratio of a continuously variable cone-pulley transmission also depends on the load, i.e., the power output flowing through the transmission. It is therefore advantageous if the current value required for holding the transmission in underdrive is corrected with a load-dependent adjustment. Consequently, the current required for holding the transmission in underdrive, or also the current required for holding the transmission at the set reverse-drive ratio, by way of a pilot pressure acting on the transmission-ratio valve is no longer constant, but is composed of a load-independent portion and a load-dependent portion.

The load-dependent portion can be determined by running the transmission in a regulated underdrive mode while varying the output torque of an engine that is coupled to the transmission, whereby a load-dependent portion of the controlling current can be determined, e.g., with the engine running in drag mode (i.e., the torque-reversal mode in which the engine acts as a brake), or other values of the load-dependent portion when the torque is varied in the normal traction mode of the vehicle. The load-independent portion of the current can at first be kept at zero and changed subsequently, if the transmission is found to depart from the set underdrive condition, in which case the controlling current can, e.g., be raised by a certain amount. In reverse drive in a set underdrive ratio, it is possible to monitor the transmission either only at the beginning of the backwards motion or also repeatedly during the reverse-drive motion and to make appropriate adjustments as required in the load-independent and load-dependent portions of the current value.

In addition to the importance for the slow range, it is also essential at other transmission ratios of a continuously variable cone-pulley transmission that a set ratio is kept essentially constant. A set transmission ratio can be maintained at a constant level by setting up a counterforce acting in opposition to the ratio-changing force of a piston-cylinder unit, so that the ratio-changing force is in equilibrium with the counterforce and, therefore, no further change will take place in the transmission ratio. It is possible in this manner to establish an equilibrium between the ratio-changing force and the counterforce at any point within the entire range of ratios of the continuously variable cone-pulley transmission. Therefore, according to a further developed advantageous embodiment of the invention, the ratio of a continuously variable cone-pulley transmission is set to maintain an essentially constant value through a process in which the transmission is first set to the targeted ratio by pressurizing two piston/cylinder units and the set ratio is subsequently maintained by applying a holding pressure to at least one of the piston/cylinder units.

Under the method just described, the amount of the holding pressure is determined depending on the transmission ratio. In the slow range of the transmission, the value resulting from the ratio-dependent determination can be raised by a preset amount that is specific to the individual transmission, to hold the latter in the slow range. Thus, if the values of the holding pressure as a function of the transmission ratio are known, it is possible to establish a corresponding value for the controlling current based on the holding pressure for one piston/cylinder unit or also for both piston/cylinder units and from the characteristic curve of the transmission-ratio valve, so that the current is sufficient to securely hold the set transmission ratio, but significantly lower than a current value that would be dictated by the random variation in the serial production of transmissions with regard to the current level required for the secure holding of a set ratio.

In an advantageous embodiment of the invention, the transmission ratio is monitored, and if the transmission ratio is found to have changed, the holding pressure is raised by a preset amount. If the controlling quantity for the transmission-ratio valve is a controlling current, the latter is adjusted by a preset amount, e.g., by one percent, after a change has been detected in the transmission ratio, so that the transmission returns to the set ratio or a further change of the ratio is prevented.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The following detailed explanation of the invention is based on the attached drawings, wherein.

DESCRIPTION OF PREFERRED EMBODIMENTS

Figure 1:
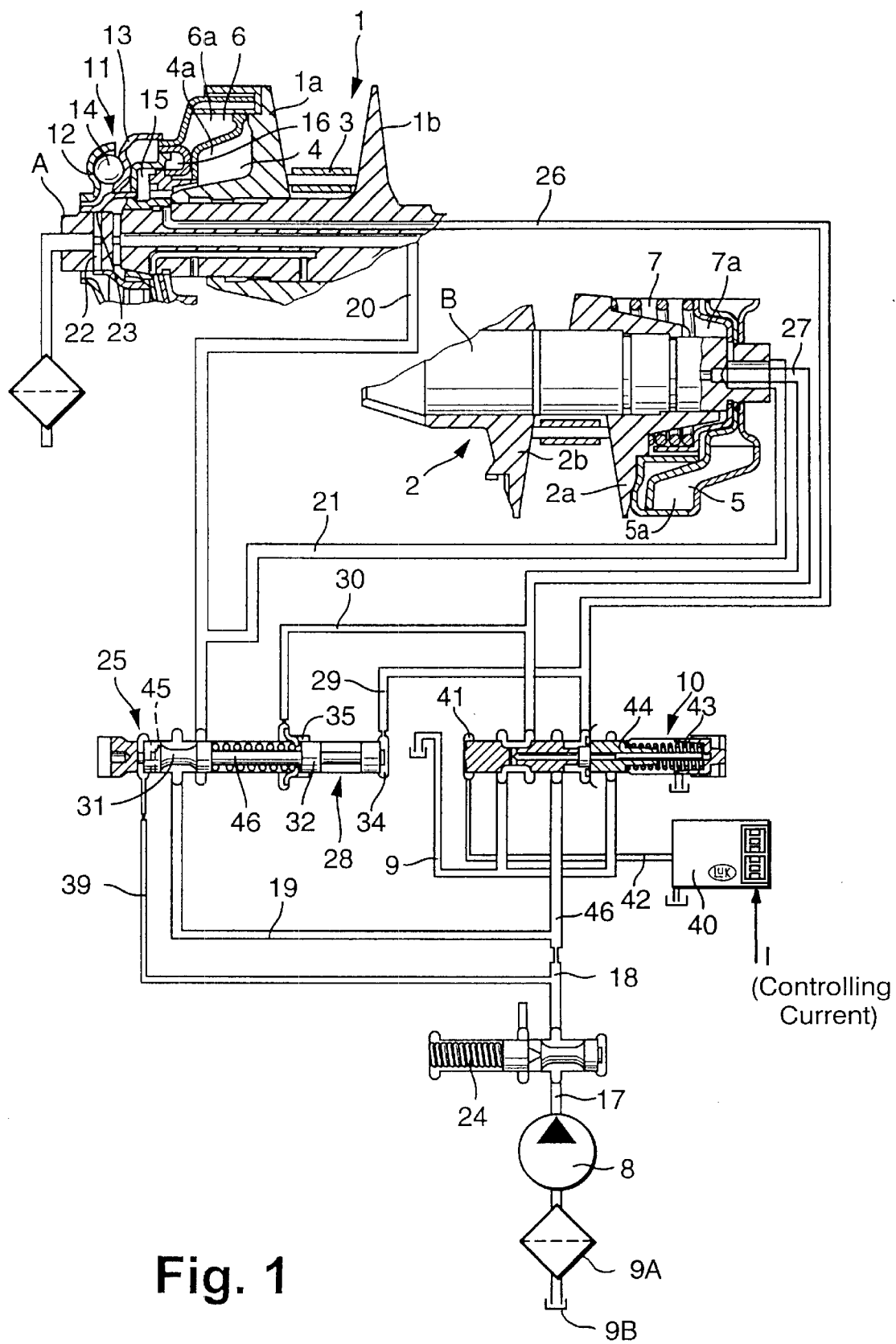
FIG. 1 represents a general view of a hydraulic circuit with a continuously variable transmission shown as an aid in explaining the function.

FIG. 1 gives a general view of a hydraulic circuit and parts of a continuously variable cone-pulley transmission used in the power train of a motor vehicle. The transmission comprises a first cone pulley 1 mounted on a first shaft (input shaft) A, a second cone pulley 2 mounted on a second shaft (output shaft) B, and an endless flexible element 3 (such as a chain or belt, hereinafter referred to as chain-belt) which is trained over the pulleys 1 and 2. The cone pulleys 1, 2 are pairs of conical discs that are rotationally constrained to their respective shafts A, B. In each pair, one disc (1b, 2b, respectively) is axially fixed while the other disc (1a, 2a, respectively) is axially movable on the respective shaft A, B. The chain-belt 3 normally transmits torque from the pulley 1 to the pulley 2 at a ratio which is dependent upon the axial positions of the movable discs 1a, 2a in relation to the associated fixed discs 1b, 2b.

A first piston/cylinder unit 4 serves to apply an axial force to the first cone pulley or disc pair 1 so that a pressurization of the first piston/cylinder unit 4 causes an axial displacement of the axially movable disc 1a on the shaft A. A similar, second piston/cylinder unit 5 is provided to apply an axial force to the second cone pulley or disc pair 2 so that a pressurization of the second piston/cylinder unit 5 causes an axial displacement of the axially movable disc 2a on the shaft B. The purpose of the first and second piston/cylinder units 4, 5 is to maintain the frictional gripping contact of the disc pairs 1, 2 against the chain-belt.

The first disc pair 1 is further equipped with a third piston/cylinder unit 6 in addition to the first piston/cylinder unit 4, and the second disc pair 2 is equipped with a fourth piston/cylinder unit 7 in addition to the second piston/cylinder unit 5. The piston/cylinder units 6, 7 are used to set or change the ratio of the transmission, i.e., the ratio between the rpm rates of the shafts B and A, respectively. The piston/cylinder units 6, 7 respectively comprise pressure chambers 6a, 7a which are filled with a suitable hydraulic fluid (such as oil). The illustrated source of pressurized hydraulic fluid is a pump 8 which can supply fluid to the pressure chambers 6a, 7a by way of a volumetric flow-regulating valve 24 (hereinafter called regulating valve, for short). To set a targeted transmission ratio, some or all of the fluid is drained from one of the chambers 6a, 7a, while the other chamber receives pressurized fluid from the pump 8 (or vice versa). The chamber from which fluid is to be drained can be connected to a drain conduit that leads to a reservoir 9A (e.g., a sump) which, in turn, serves to supply fluid to the intake of the pump 8 by way of a suitable filter 9B. The flow of hydraulic fluid to and from the pressure chambers 6a, 7a is controlled by a transmission-ratio controlling valve 10 (hereinafter called transmission-ratio valve). The transmission-ratio valve 10 is arranged in the hydraulic circuit downstream of the regulating valve 24.

A torque sensor 11 on the shaft A serves to generate a fluid pressure that is a function of at least one variable, namely the torque which is being transmitted by the input shaft A to the first cone pulley 1. To this end, the sensor 11 transmits torque to a first ramp disc 12 which is secured to the shaft A against axial movement but can turn, within limits, in relation to shaft A. The first ramp disc 12 cooperates with a second ramp disc 13 which is movable axially of the shaft A. The ramp discs 12, 13 have confronting surfaces with ramps by which the axially fixed first ramp disc 12 exerts a push against the axially movable ramp disc 13 by way of space-holder bodies in the form of balls 14. Thus, when the ramp disc 12 is rotated in relation to the ramp disc 13, the balls 14 will roll up the ramps and thereby cause an axial displacement of the ramp disc 13 in relation to the ramp disc 12.

The torque sensor 11 is further provided with a first pressure chamber 15 which can receive pressurized fluid from the source (pump) 8 by way of a hydraulic line including conduits 18, 19 and 20. The fluid pressure in the chamber 15 varies depending on the variations of the torque to be transmitted, which is acting on the sensor 11. The conduit 20 comprises a branch 21 through which the outlet of the pump 8 can be connected to the chamber 7a of the piston/cylinder unit 7.

The pressure chamber 15 of the torque sensor 11 is also connected (by a conduit not shown) with the pressure chamber 4a of the piston/cylinder unit 4. The shaft A has at least one radially extending fluid-evacuating bore or port 22 which can drain fluid from the chamber 15 of the torque sensor 11 by way of a passage of variable aperture at the interface between the shaft A and the axially movable ramp disc 13. The variable-aperture passage constitutes a throttle valve 23 which is opened and closed by the axial movement of the ramp disc 13. Thus, the axially movable ramp disc 13 functions like a valve piston that opens and closes the throttle valve 23 depending on the amount of torque that is to be transmitted, so that a pressure that originates from the pump 8 can be built up in the pressure chamber 15 of the torque sensor 11.

The fluid pressure in the chamber 4a of the piston/cylinder unit 4 matches or closely approximates the pressure of fluid in the chamber 15 due to the provision of the aforementioned fluid conveying conduit or channel or bore between the chambers 4a and 15. With conduits 20, 21 connecting the chamber 15 of the torque sensor 11 to the chamber 5a of the piston/cylinder unit 5, the pressure of hydraulic fluid in the chamber 5a matches or at least approximates that in the chamber 4a.

The respective levels of fluid pressure in the chambers 6a, 7a determine the ratio of the continuously variable transmission. The piston/cylinder units 6, 7 are respectively connected in parallel with the piston/cylinder units 4, 5, i.e., the forces generated by the parallel-connected piston/cylinder units are superimposed upon each other, so that the ratio-controlling forces generated by the fluid pressures in chambers 6a, 7a are added to the forces generated by the torque-dependent fluid pressure in the chambers 4a, 5a.

The torque sensor 11 is further equipped with a second pressure chamber 16. The first and second pressure chambers 15, 16 of the torque sensor can be connected or separated depending on the prevailing transmission-ratio. When the chambers 15, 16 are free to communicate with each other, the area of the combined surface being acted on by the fluid pressure is increased accordingly. The communication between the chambers 15, 16 of the torque sensor 11 is established or interrupted by the axially movable conical flange 1a of the pulley 1. Thus, the flange 1a constitutes the movable element of a valve which regulates the flow of hydraulic fluid between the chambers 15, 16 by way of channels, bores and/or other forms of passages that can be provided in the shaft A, in the components of the disc pair 1, or in the torque sensor 11.

The arrangement is (or can be) such that the chamber 15 can receive pressurized fluid from the pump 8 but is sealed from the chamber 16 when the transmission is set for a step-down ratio, i.e., when shaft B rotates at a slower rpm rate than shaft A. The chamber 16 can be opened up to the chamber 15 when the transmission ratio is increased towards a step-up ratio where shaft B rotates at a faster rpm rate than shaft A, e.g., at a ratio of 1:1. With the just described concept of connecting the chamber 16 to the chamber 15 of the torque sensor 11, it is possible to achieve a ratio-dependent modulation of the fluid pressure that is superimposed on the torque-dependent modulation.

To recapitulate: by switching the pressurization from the first pressure chamber 15 alone to the combination of the chambers 15 and 16 at a transmission ratio around 1:1, only the first chamber 15 is pressurized when the transmission operates at a step-down ratio. In contrast, when the transmission operates at a step-up ratio, both of the chambers 15 and 16 are pressurized. Thus, with a given amount of input torque acting on the sensor 11, the pressure generated by the torque sensor 11 when the transmission operates at a step-down ratio is higher than with a step-up ratio because, at a step-down ratio, the axial sensor force acts against the fluid only through the axially effective surfaces of chamber 15 while, at a step-up ratio, the axial sensor force acts against the fluid through the combined axially effective surfaces of chambers 15 and 16.

The regulating valve 24 receives a constant flow of pressurized fluid from the outlet of the pump 8 by way of a conduit 17 and serves to regulate the volumetric flow to the transmission-ratio valve 10 by way of the conduit 18 which contains a flow restrictor (throttle). The pump 8 supplies pressurized fluid to the chambers of all four hydraulic piston/cylinder units 4, 5 and 6, 7 as well as to the torque sensor 11. The hydraulic system further comprises a pressure-regulating valve 25 which cooperates with an OR-valve 28 and serves to raise the pressure of fluid in the conduit 18 upstream of the transmission-ratio valve 10. The pressure of fluid in the conduit 18 is higher than that in the conduits 26, 27 which connect the transmission-ratio valve 10 to the piston/cylinder units 6, 7, respectively, that serve to set or change the transmission ratio.

FIG. 1 further shows that the pressure-regulating valve 25 is also connected to the torque sensor 11 and to the chamber 4a of the hydraulic piston/cylinder unit 4 by way of the conduit 20, and to the chamber 5a of the hydraulic piston/cylinder unit 5 by way of the branch conduit 21. The fluid pressure in the chambers 4a, 5a depends on the pressure supplied by the torque sensor 11, i.e., on the amount of torque being transmitted to the torque sensor. Furthermore, as mentioned previously, the torque sensor 11 can superimpose a transmission-ratio dependent modulation of pressure on the torque-dependent pressure modulation.

In a case where the torque sensor 11 receives only a small amount of torque, i.e., when it generates a relatively low fluid pressure, it is possible that, under certain critical circumstances, the ratio-dependent pressure is not large enough to achieve a desired rapid change of the transmission ratio. This situation can arise, for example, when the motor vehicle undergoes a pronounced deceleration at a low engine torque, in which case it is necessary to achieve a rapid change of the transmission ratio. The pressure-regulating valve 25 ensures that, under the just outlined circumstances, the pressure upstream of the transmission-ratio valve 10 is sufficient for the desired rapid change of the transmission ratio, which necessitates a high fluid pressure in the conduit 26 or 27 to thus provide the required fluid pressure in the chambers 6a, 7a of the piston/cylinder units 6 and 7. The valve 25 cooperates with the OR-valve 28 to reduce the flow in conduit 20 so that the fluid pressure rises in the conduits 18 and 19 upstream of the transmission-ratio valve 10. Thus, the fluid pressure upstream of the transmission-ratio valve 10 is higher than in the conduits 26 and 27.

The conduits 29, 30 communicate the elevated fluid pressure of the conduits 26, 27 to the arrangement including the pressure-regulating valve 25 and the associated OR-valve 28. The pressure regulating valve 25 comprises a housing or body having a bored cavity 45 for an axially movable valve piston 31. The bore 45 further confines an axially movable valve piston 32 that forms part of the OR-valve 28. The arrangement is such that the piston 31 can move in the valve bore 45 independently of the piston 32 and vice versa.

The valve pistons 31, 32 bear against each other through an interposed member 46. The conduit 29 connects the conduit 26 to a pressure chamber 34 of the OR-valve 28, and the conduit 30 connects the conduit 27 to a pressure chamber 35 that is located between the pistons 31 and 32. When the fluid pressure in the conduit 27 is higher than in conduit 26, the corresponding fluid pressure that is communicated through the conduit 30 to the chamber 35 will act directly on the valve piston 31 of the pressure regulating valve 25. On the other hand, if the fluid pressure in conduit 26 is higher than in the conduits 27, 30, the fluid pressure communicated through conduit 29 to the chamber 34 will act against the valve piston 32 which, by way of the interposed element 46, will push the valve piston 31 in the direction where the latter will close off the passage of fluid. Based on the foregoing description, it should be clear that the valve 28 functions as an OR-valve in that it ensures that the valve piston 31 of the valve 25 is acted on either by the pressure in conduit 29 or conduit 30, depending on whichever of the two pressures is higher. The valve 25 further comprises a compression spring 36 (here shown as a coil spring) which is seated against a retainer 37 in the valve bore 45 and bears against the valve piston 31. The magnitude of the initial biasing force of the spring 36 is selected so as to ensure a minimum pressure level in the conduit 19 upstream of the transmission-ratio valve 10 as required to perform changes of the transmission ratio.

The bored cavity of the valve 25 further contains a pressure chamber 38 at the end of the valve piston 31 that faces away from the valve spring 36. By way of the conduit 39, the chamber 38 shares the fluid pressure of conduit 18, i.e., the upstream pressure of the transmission-ratio valve 10. The purpose of applying pressure to the valve piston 31 through the chamber 38 is to ensure that, with a minimum amount of pressure in the conduits 18 and 19, the valve piston 31 can release a passage for the flow of fluid to the conduit 20 and the branch conduit 21 and hence to the chamber 15 of the torque sensor 11. Thus, the valve spring 36 and the assembly including the valves 25, 28 determine the minimum fluid pressure in the conduits 18 and 19. At the same time, subjecting the valve piston 31 to the pressure in the chamber 38 on the one hand and to the higher of the pressures in the conduits 26, 27 on the other hand assures that a desired pressure differential is maintained between the maximum fluid pressure in the conduits 26 or 27 and the pressure upstream of the transmission-ratio valve 10.

The hydraulic circuit of FIG. 1 further comprises a proportional valve 40 which, through conduit 42, controls the fluid pressure in a chamber 41 of the transmission-ratio valve 10. The fluid pressure in the chamber 41 is opposed by the bias of a helical valve spring 43. When the fluid pressure in the chamber 41 is low or zero, the spring 43 maintains the valve piston 44 in an axial position in which the conduit 27 communicates with the sump 9A by way of the return conduit 9. At the same time, the valve piston 44 releases a passage connecting the conduit 26 to the conduits 18, 19. Thus, the fluid pressure in the conduit 27 is zero or close to zero while the pressure of fluid in the conduit 26 matches or approximates the fluid pressure at the outlet of the pump 8. The result is that the ratio of the transmission is increased, i.e., the output rpm rate is raised in relation to a given input rpm rate.

When the fluid pressure in the chamber 41 of the transmission-ratio valve 10 is increased (by the action of the proportional valve 40), the valve piston 44 is shifted axially against the opposition of the valve spring 43 so that the conduit 18 communicates with the conduit 27 while, at the same time, the valve piston 44 connects the conduit 26 with the sump 9A by way of the return conduit 9. As a result, the ratio of the transmission is decreased, i.e., the output rpm rate is lowered in relation to a given input rpm rate. Thus, by controlling the fluid pressure in the chamber 41 through an appropriate input to the proportional valve 40, the fluid pressure in the conduits 26 or 27 can be varied between a maximum pressure that equals the supply pressure in conduit 18 and a minimum pressure which corresponds to the virtually pressure-free state when either one of the conduits is connected to the drain conduit 9. The operation of the proportional valve 40 can be controlled by a suitable state-of-the art electronic control circuit (not shown).

Although the embodiment according to the foregoing description includes the proportional valve 40 to control the transmission-ratio valve 10 by applying a pilot pressure to the chamber 41, it should be noted that the transmission-ratio valve 10 can also be of a design, where an electric controlling current acts directly on the valve piston 44 of the transmission-ratio valve 10. For example, the means for moving the valve piston 44 axially against the bias of the valve spring 43 can comprise an electromagnet connected to a suitable control unit, so that the electromagnet determines the axial position of the valve piston 44 which, in turn, controls the pressure levels that are communicated to the ratio-controlling piston/cylinder units 6, 7 by way of the conduits 26, 27.

Figure 2:
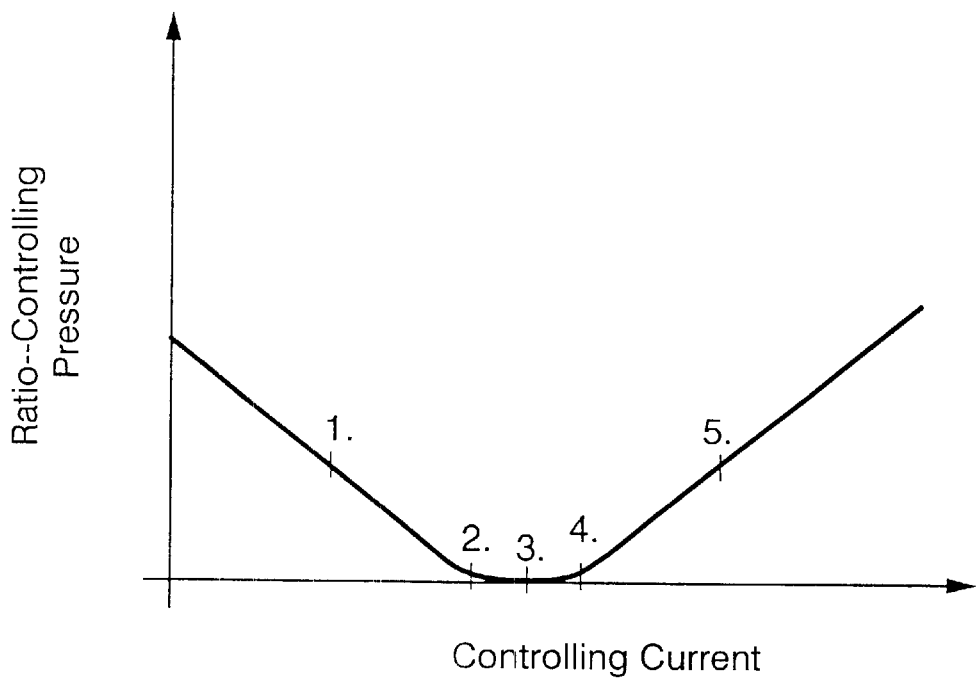
FIG. 2 represents a graph of a characteristic curve of a transmission-ratio valve in which the pressure is plotted as a function of the controlling current.

FIG. 2 represents a graph of a characteristic curve of a transmission-ratio valve in which the ratio-controlling pressure is plotted as a function of the controlling current that is supplied either to a proportional valve such as the proportional valve 40 of FIG. 1, or directly to the transmission-ratio valve. As the graph shows, the characteristic curve has a range where the pressure is switched over from one of the disc pairs to the other. The curve passes through a minimum (herein referred to as inversion point) in the area of the pressure switch, where the portion of the graph to the left of the inversion point represents the ratio-controlling pressure that the transmission-ratio valve supplies to the ratio/controlling piston cylinder on the input shaft, while the portion to the right of the inversion point represents the ratio-controlling pressure supplied to the piston/cylinder unit on the output shaft.

When the piston/cylinder unit on the input shaft is to be supplied with a ratio-controlling pressure that corresponds to the operating point 1 in the characteristic curve of FIG. 2, the transmission-ratio valve is controlled (directly or indirectly) by an amount of current represented by the abscissa of point 1 in FIG. 2. A change from a previous level of the controlling current to the new current level of point 1 will cause the ratio-controlling pressure to respond in a way that is illustrated by the curve 1 in FIG. 3, i.e., the pressure passes through a transient (damped) oscillation phase before it settles at the new target level represented by the horizontal line in FIG. 3 that indicates 100% of target.

Figure 3:
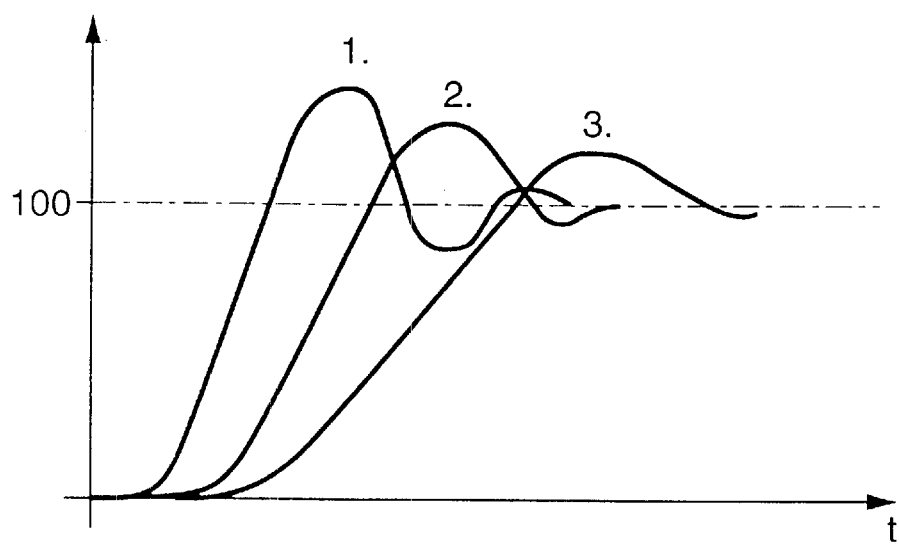
FIG. 3 represents a graph of the oscillatory settling responses corresponding to the operating points indicated in the characteristic curve of FIG. 2.

As can be seen from FIG. 3, the change in the controlling quantity causes a change of the controlled quantity to the new target value after passing through an oscillatory settling phase. The time interval required for the transient oscillation to settle down at the new target value can be read qualitatively from the length of the corresponding segment on the abscissa. In the ratio-changing process according to curve 1 in FIG. 3, the regulation is performed by using a nominal (100%) value for the control parameters of the regulating servo.

However, if the same nominal values were used to set a new target pressure corresponding to operating point 2 of FIG. 2, the regulation would become unstable, i.e., the oscillation of the pressure level would not settle down at the target value. Therefore, in order to arrive at a targeted pressure corresponding to operating point 2 of FIG. 2, the regulation is performed with corrected control parameters that are adjusted to, e.g., 50% of the nominal parameter values that were used for the regulation at operating point 1 of FIG. 2. Analogously, the regulation at operating point 3 can be performed with control parameters that are adjusted to 25% of the nominal parameter values. If operating points between those shown in FIG. 2 are to be attained, the corresponding values of the control parameters can be determined by linear interpolation.

If a ratio-controlling pressure is to be set according to operating point 4 of FIG. 2, a given amount of change of the controlling current will cause a greater change in the ratio-controlling pressure than would be generated by a current change of the same magnitude at operating point 3, simply because the characteristic curve has a steeper slope at point 4 than it has at point 3. Accordingly, the transmission-ratio valve has a stronger dynamic response at operating point 4 than it has at operating point 3, so that larger parameter values, for example 50% of nominal, can be used at point 4. With analogous reasoning, the control parameters in the area of operating point 5 can be raised further, for example to 100% of nominal, because the absolute value of the slope of the characteristic curve at point 5 and thus the dynamic response of the transmission-ratio valve is comparable to operating point 1.

If the servo behavior of the transmission-ratio valve can be described as a change in amplification, where the amplification or gain in the zero-pressure area is markedly lower than in the branches of the operating characteristic on both sides, it is advantageous to store the amplification profile as a gain curve and to use a correction adjustment whereby the control parameters are multiplied by the inverse amount of the gain. This procedure allows the response behavior of the transmission-ratio valve to be linearized.

Figure 4:
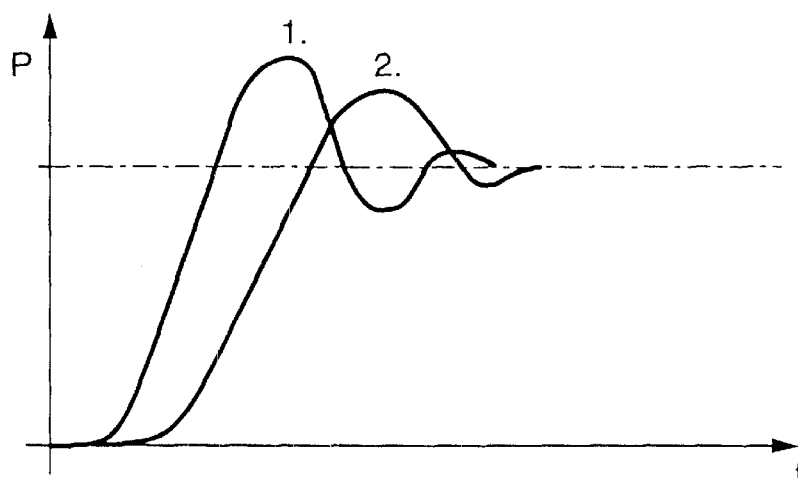
FIG. 4 represents two different settling responses at different temperature levels of the working fluid.

The graph of FIG. 4 shows again two examples of the oscillatory settling of the pressure, analogous to FIG. 3. The representation of FIG. 4 is based on the assumption of a temperature-dependent servo behavior of the transmission-ratio valve, so that the dynamic response decreases with a rise in temperature. If the regulation were performed with fixed control parameters, the servo loop could possibly become unstable at higher temperatures. It is therefore advantageous to reduce the control parameter values with increasing temperature. As an example, the parameter values could be set to 100% of nominal when the oil temperature is at 40° C., and reduced to 80% of nominal if the oil temperature has risen to 80° C. With a further temperature increase, e.g. to 120° C., the control parameters could be further reduced to 50% of the nominal values that are used at 40° C.

The transmission-ratio valve is part of a hydraulic circuit and is supplied with an input pressure that corresponds to a prevailing system pressure of the hydraulic circuit. The system pressure is determined by the magnitude of the gripping pressure that is used to hold the chain-belt between the pairs of conical discs, if the ratio-controlling pressure is lower than the gripping pressure, because the chain-belt requires a minimum amount of gripping pressure to avoid slippage. If the ratio-controlling pressure is higher than the gripping pressure, then the system pressure is determined by the ratio-controlling pressure. Accordingly, there can be a variable pressure difference between the system pressure and the ratio-controlling pressure. The variable pressure difference can lead to variations in the behavior of the transmission-ratio valve, so that the control parameters will have to be adjusted. A higher pressure difference translates into a stronger dynamic response of the transmission-ratio valve, meaning that the values of the control parameters will have to be increased. For example, the control parameters can be standardized to take on their nominal 100% values at a pressure difference of 6 bar between the system pressure and the ratio-controlling pressure. If the pressure difference rises, e.g. to 20 bar, this can necessitate an increase of the parameter values to e.g., 110%, and if the pressure difference rises, e.g. to 40 bar, this can lead to an increase of the parameter values to e.g., 120%. The purpose of increasing the control parameters is to prevent the regulation from becoming more sluggish with a rising pressure difference.

Figure 5A:
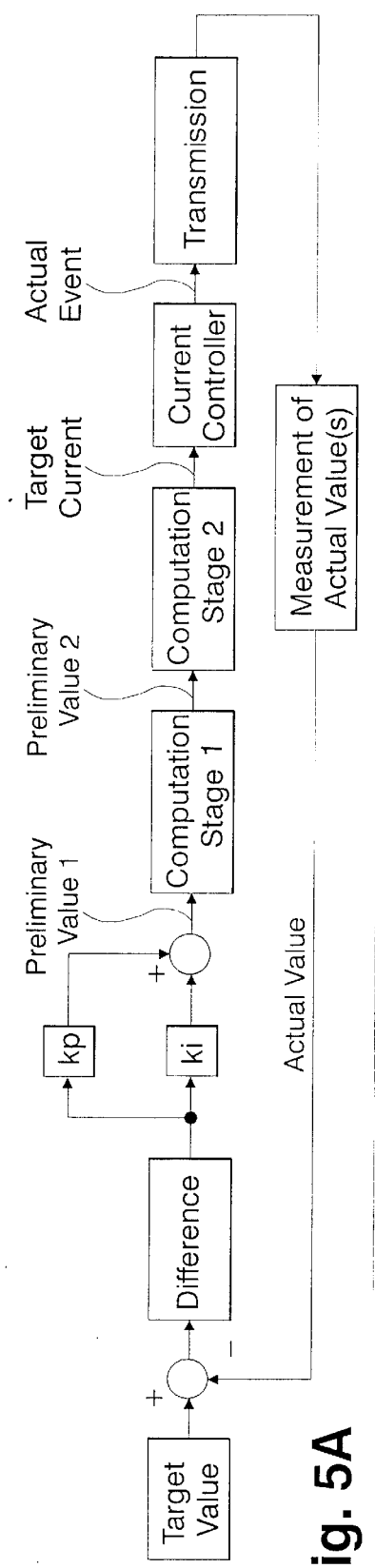
FIG. 5A represents a schematic view of a feed-back servo without a corrective adjustment of the control parameters.

FIG. 5A represents a schematic view of a feed-back servo without a corrective adjustment of the control parameters. An actual value registered by a detector or sensor device is compared to a target value. If a difference between actual value and target value is found, the servo device responds by attempting a compensation that reflects either the value of the difference itself (proportional mode) or the time integral of the difference (integrating mode), or a combination of both in the case of a so-called P/I-servo. In the system of FIG. 5A, the control parameters P and I (i.e., the respective coefficients of the proportional and integrating terms of the transfer function) of the transmission-ratio valve have constant values. The respective proportional and integral terms of the corrective adjustment are calculated based on the nominal values kp and ki of the control parameters whereby the level of the controlling current to be used for the adjustment is determined. One or more actual measurement values that are relevant for the quantity being regulated are fed back to the input of the loop, whereupon the cycle repeats itself.

Figure 5B:
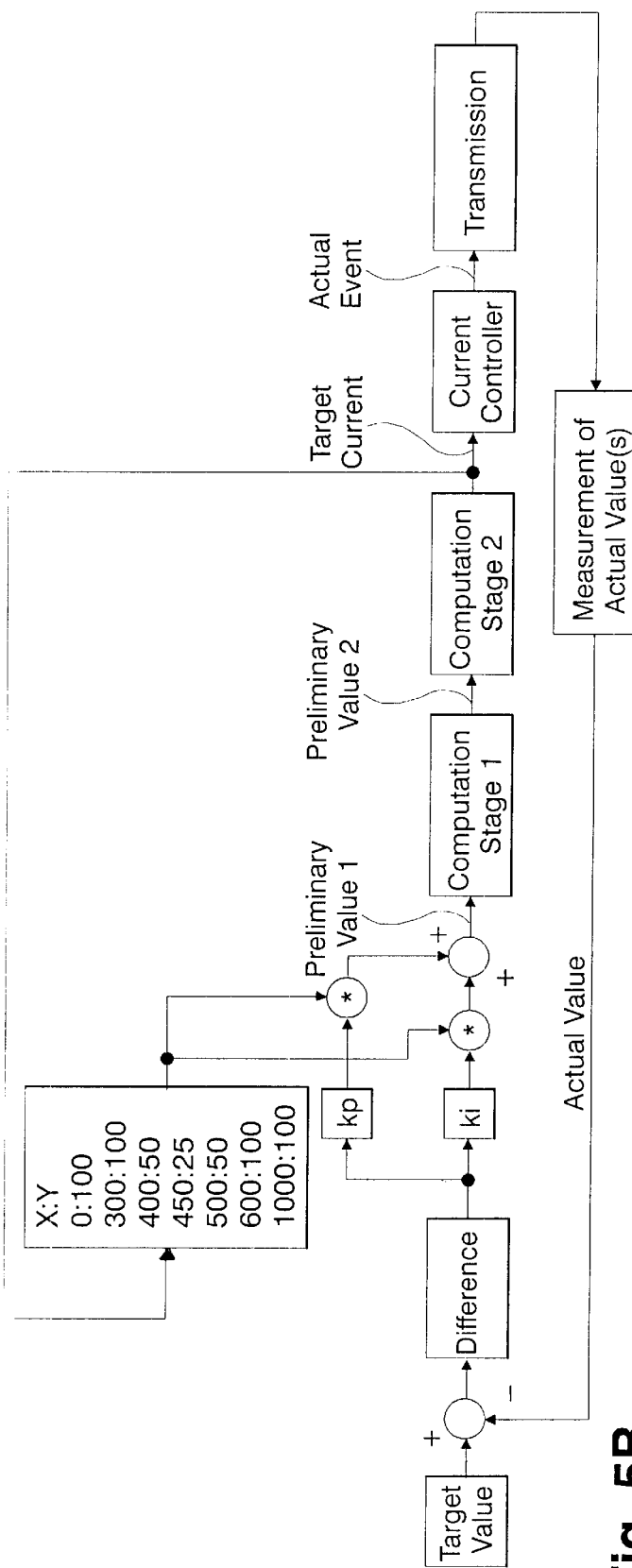
FIG. 5B represents a schematic view analogous to FIG. 5A, but including a corrective adjustment of the control parameters.

FIG. 5B represents a servo loop that is analogous to FIG. 5A, but includes a corrective adjustment of the control parameters. The control parameters are adjusted to a value that depends on the magnitude of the controlling current as represented by the respective abscissae of the different operating points in FIG. 2. Thus, depending on the operating point of the transmission-ratio valve, the respective nominal (100%) values kp and ki of the control parameters P and I are subject to adjustments. According to an X/Y lookup table (see FIG. 5B), which is to serve merely as an example, the control parameters are set to 100% if the target level of the controlling current is 0, and are reduced to 50% if the target level of the controlling current is 400 mA. At a target value of 450 mA, corresponding to an operating point of near-zero pressure of the transmission-ratio valve, the parameter values are further reduced to 25%, to be raised again as the ratio-controlling pressure increases past the inversion point of the operating characteristic. In other words, the gain of the regulating loop is lowered in the area where the transmission-ratio valve is at or near zero-pressure, thereby allowing for a slower dynamic response of the transmission-ratio valve in the zero-pressure area and avoiding the risk of destabilizing the servo loop with an excessively strong response of the regulating servo.

Figure 6A:
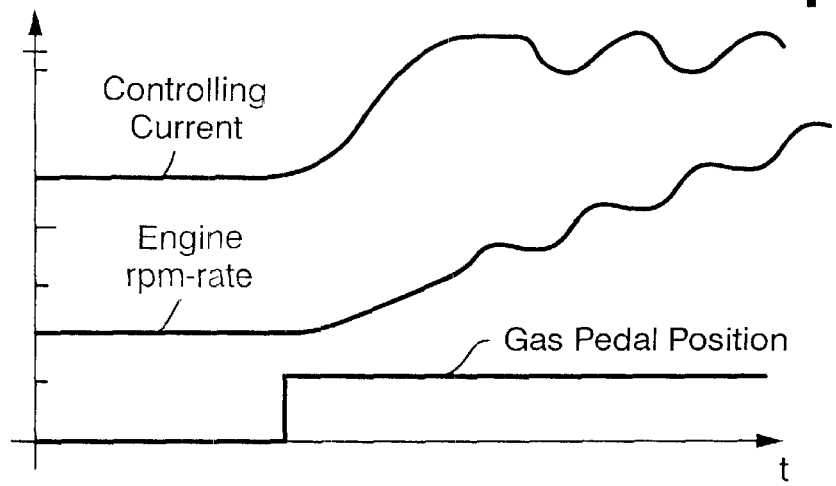
FIG. 6A represents a schematic view of the time profile of the controlling current and the rpm rate with a step change in the position of the accelerator pedal, using fixed control parameters in accordance with FIG. 5A.

FIG. 6A represents a schematic view of the time profile of the controlling current and the rpm rate with a step change in the position of the accelerator pedal, using fixed control parameters in accordance with FIG. 5A. The driver's desire to accelerate the vehicle manifests itself in a step change of the gas-pedal position. In the illustrated case, i.e., using constant values for the control parameters, the immediate consequence is an increase of the controlling current ivu and the engine-rpm rate nmot. After the current has reached the new target level, the current will no longer settle at the new level but will continue to oscillate, so that the oscillating current causes an oscillation of the ratio-controlling pressure. The oscillatory variations of the transmission ratio will, in turn, cause an oscillatory variation of the engine-rpm rate nmot.

Figure 6B:
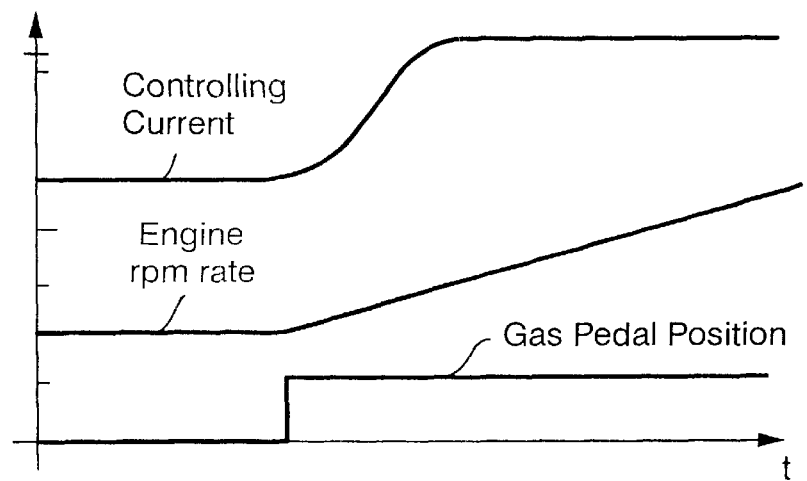
FIG. 6B represents a schematic view analogous to FIG. 6A, but using corrected or adjusted control parameters in accordance with FIG. 5B.

FIG. 6B illustrates the behavior of the regulation if corrected or adjusted control parameters are used. With the same change in the gas pedal position as in FIG. 6A, the current ivu runs at a stable level after it has reached the new target value. The engine-rpm rate rises at a uniform rate consistent with the drivers desire for acceleration. The regulating servo operates in a stable mode and stays clear of the critical stability limit.

Figure 7:
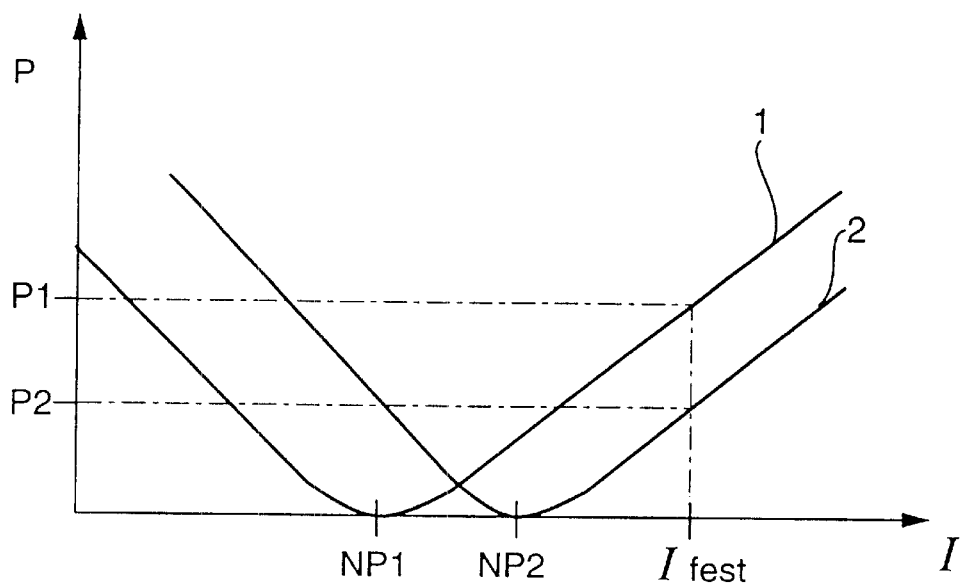
FIG. 7 represents a graph of the characteristic curves of two transmission-ratio valves analogous to the curve of FIG. 2, using a fixed current value for holding a set slow transmission ratio without applying the inventive method.

FIG. 7 illustrates the respective characteristic profiles of the transmission-ratio valves of two different continuously variable cone-pulley transmissions. The characteristic curve 1 shows the ratio-controlling pressure as a function of the controlling current for the transmission-ratio valve of a first transmission, while the characteristic curve 2 shows the analogous pressure/current profile for the transmission-ratio valve of a second transmission. Illustrating the random difference between production units, curve 2 is shifted to the right in relation to curve 1. Consequently, a fixed amount $I_{fest}$ of the controlling current that produces a ratio-controlling pressure p1 in the valve of curve 1 will produce a ratio-controlling pressure p2 in the valve of curve 2, with p2 markedly smaller than p1. This means that with the fixed amount of controlling current $I_{fest}$, the transmission with the transmission-ratio valve of curve 2 receives an adequate amount of pressure to maintain a set transmission ratio, while the transmission with the transmission-ratio valve of curve 1 is subjected to an excessive amount of holding pressure that can needlessly cause wear on the chain-belt.

Figure 8:
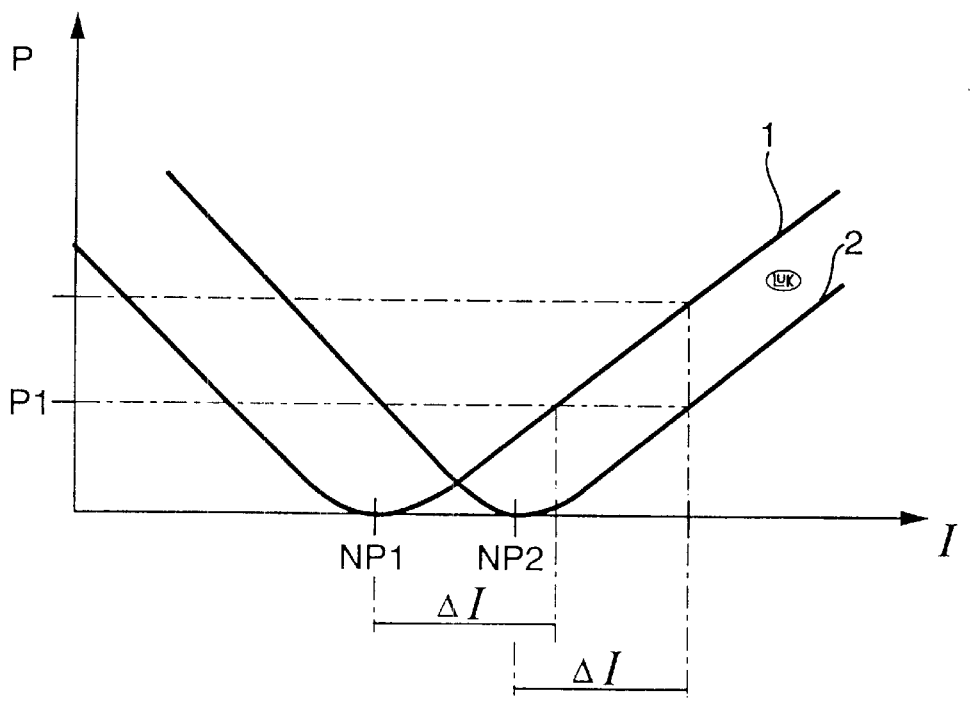
FIG. 8 represents a graph of the characteristic curves of two transmission-ratio valves analogous to FIG. 7, but using the method according to the invention.

FIG. 8 represents again a graph of characteristic curves 1 and 2 of the transmission-ratio valves of two different cone-pulley transmissions. In this case, however, by applying the method according to the invention, both transmissions receive a holding pressure p1 that is adequate for maintaining a set transmission ratio. As is clear from the drawing, the holding pressure p1 in FIG. 8 is markedly lower than the holding pressure p1 in FIG. 7. This means, that the transmission with the transmission-ratio valve of curve 1, too, receives an amount of holding pressure that is adequate (but not excessive) for maintaining a set transmission ratio. The holding pressure of the transmission-ratio valves with the illustrated characteristic profiles is set by means of a controlling current. To determine the controlling current required to produce an adequate holding pressure in a given transmission unit, the computation is adapted to the location of the zero-pressure point or inversion point in the characteristic curve of the respective transmission-ratio valve. To perform this adaptation to the specific zero-pressure point of a given transmission unit, an engine coupled to a transmission is run through a sweeping variation of its rpm rate over the entire engine-rpm range while the transmission is held in a regulated underdrive condition. During the rpm sweep from idling speed to the maximum rpm rate, the controlling current will at some point reach a maximum. It has been found that the difference $\Delta I$ between the maximum current just mentioned and the inversion-point current is essentially equal among different transmissions. Consequently, the amount of controlling current required for a secure holding pressure in any transmission can be determined by adding the current differential $\Delta I$ to the inversion-point current of the given transmission (NP1, NP2, respectively, for the curves 1 and 2 in FIG. 8). By using this method, none of the transmissions are subjected to an excessive amount of ratio-controlling pressure that could prematurely wear out the chain-belt.

To summarize, the invention provides a method of regulating by means of a regulating device the ratio-controlling pressure that is applied through a transmission-ratio valve to one or more piston/cylinder units of a continuously variable cone-pulley transmission in order to set or change the transmission ratio. According to the invention, the ratio-controlling pressure is regulated in such a way that the control parameters of the regulating device are adjusted depending on the amounts of ratio-controlling pressure to be applied and that the regulation is performed by using the adjusted control parameters.

The inventive method includes measures for maintaining a set transmission ratio at an essentially constant level. After the ratio has been set by applying a ratio-changing pressure to at least one piston/cylinder unit, a holding pressure is applied to the same or another piston/cylinder unit to maintain the set transmission ratio.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of regulating by way of a regulating device a ratio-controlling pressure of a working fluid that is applied through a transmission-ratio valve to at least one piston/cylinder unit of a continuously-variable cone-pulley transmission of a vehicle in order to set a transmission ratio, wherein the regulating device has control parameters with control-parameter values, the control-parameter values are adjusted depending on the ratio-controlling pressure to be applied, and the regulating device uses the adjusted control-parameter values to regulate the ratio-controlling pressure, wherein the transmission-ratio valve has a characteristic curve representing the ratio-controlling pressure as a function of controlling current, the characteristic curve comprising a universe of operating points of the transmission-ratio valve, and wherein further the control-parameter values are selectively adjusted at a given operating point, wherein the transmission-ratio valve has a gain factor at the given operating point and the control-parameter values are adjusted to the gain factor.

2. The method of claim 1, wherein further the control-parameter values are registered in the regulating device under at least one of the forms of representation consisting of curves, curve fields, and equations for the control parameters.

3. The method of claim 1, wherein selected control-parameter values are registered in the regulating device as table values and intermediate values for the control parameters are determined by interpolation between the table values.

4. The method of claim 1, wherein the regulating device performs consecutive regulating cycles and the control parameters are adjusted in each regulating cycle in such a manner that a change of the control-parameter value from one regulating cycle to a next-following regulating cycle is limited to a present amount.

5. The method of claim 1, wherein the regulating device is a servo-control device with a proportional component and an integrating component, a first control parameter for the proportional component and a second control parameter for the integrating component, and the first and second control parameters are adjusted individually.

6. The method of claim 1, wherein the regulating device is a servo-control device with a proportional component and an integrating component, a first control parameter for the proportional component and a second control parameter for the integrating component, and the first and second control parameters are adjusted together.

7. A method of regulating a transmission ratio of a continuously variable cone-pulley transmission of a vehicle with piston/cylinder units so that the transmission ratio is kept at an essentially constant level, wherein a ratio-changing pressure is applied to at least one piston/cylinder unit to set the transmission ratio, and a holding pressure is applied to at least one piston/cylinder unit to maintain the set transmission ratio, wherein the cone-pulley transmission comprises a transmission-ratio valve, the holding pressure is applied to the at least one piston/cylinder unit by way of said transmission-ratio valve, and said transmission-ratio valve is controlled by a controlling quantity, wherein the controlling quantity is a controlling current set to a magnitude where the holding pressure is a minimum amount of holding pressure required in an individual cone-pulley transmission, and said magnitude of the controlling current is obtain as a difference by subtracting a first amount of controlling current required to set the transmission-ratio valve to a zero-pressure condition from a second amount of controlling current required to set the transmission valve to a maximum-pressure condition, and determining said magnitude of the controlling current for said individual cone-pulley transmission by adding said difference to said first amount.

8. The method of claim 7, wherein the transmission ratio is a ratio that corresponds to a slow speed of the vehicle.

9. The method of claim 7, wherein the controlling current is acting directly on the transmission-ratio valve.

10. The method of claim 7, wherein the transmission ratio is continuously monitored and upon detecting a change of the transmission ratio, the holding pressure is increased by a predetermined amount.

11. The method of claim 7, wherein the transmission ratio is ratio that is used for a reverse-drive mode of the vehicle.

12. A continuously variable transmission of a vehicle comprising:

a first adjustable cone-pulley mounted on an input shaft, a second adjustable cone-pulley mounted on an output shaft, and a chain-belt arranged to transmit a torque between said first and second adjustable cone pulleys;

at least one piston/cylinder unit arranged on at least one of said first and second adjustable cone pulleys and operative to adjust said cone pulleys by means of ratio-controlling pressure of a working fluid in order to set a transmission ratio of said continuously variable transmission, a regulating device and a transmission-ratio valve, said regulating device performing a control function to control said transmission-ratio valve in setting the ratio-controlling pressure;

wherein said control function uses control parameters with control-parameter values, the control-parameter values are adjusted depending on the ratio-controlling pressure to be applied, and the regulating device uses the adjusted control-parameter values to regulate the ratio-controlling pressure, wherein the transmission value has a characteristic curve representing the ratio-controlling pressure as a function of a controlling current, the characteristic curve comprising a universe of operating points of the transmission-ratio valve, and wherein further the control-parameter values are selectively adjusted at a given operating point, wherein the transmission-ration valve has a gain factor at the given operating point and the control-parameter values are adjusted to the gain factors.

* * * * *